United States Patent
Nam et al.

(10) Patent No.: US 9,654,272 B2
(45) Date of Patent: May 16, 2017

(54) METHOD FOR MULTI-INPUT MULTI-OUTPUT COMMUNICATION IN LARGE-SCALE ANTENNA SYSTEM

(71) Applicant: Electronics & Telecommunications Research Institute, Daejeon (KR)

(72) Inventors: Jun Young Nam, Daejeon (KR); Young Jo Ko, Daejeon (KR); Jae Young Ahn, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 64 days.

(21) Appl. No.: 14/200,557

(22) Filed: Mar. 7, 2014

(65) Prior Publication Data

US 2014/0254517 A1    Sep. 11, 2014

(30) Foreign Application Priority Data

Mar. 8, 2013 (KR) .................. 10-2013-0025206
Mar. 13, 2013 (KR) .................. 10-2013-0026472
(Continued)

(51) Int. Cl.
*H04L 5/00* (2006.01)
*H04B 7/0417* (2017.01)
(Continued)

(52) U.S. Cl.
CPC ......... *H04L 5/0057* (2013.01); *H04B 7/0417* (2013.01); *H04B 7/0452* (2013.01);
(Continued)

(58) Field of Classification Search
CPC ... H04L 5/0057; H04B 7/0452; H04B 7/0456; H04B 7/0417; H04B 7/0639; H04B 7/0617; H04B 7/063; H04B 7/0486
See application file for complete search history.

(56) References Cited

U.S. PATENT DOCUMENTS

2007/0110132 A1* 5/2007 Guess et al. .................. 375/148
2008/0004030 A1* 1/2008 Frederiksen et al. ......... 455/450
(Continued)

FOREIGN PATENT DOCUMENTS

KR  10-2013-0097117 A   9/2013
WO  WO 2011/138979 A1  11/2011

OTHER PUBLICATIONS

Nam, Junyoung, et al. "Joint spatial division and multiplexing: Realizing massive MIMO gains with limited channel state information." *Information Sciences and Systems (CISS)*, 2012 46th Annual Conference on. IEEE, 2012. (6 pages in English), Mar. 2012.

(Continued)

*Primary Examiner* — Mohammad Anwar
(74) *Attorney, Agent, or Firm* — NSIP Law

(57) ABSTRACT

Disclosed is a method for multi-input multi-output transmission of a base station in a wireless communication system. The method includes obtaining channel information of one or more terminals, classifying the one or more terminals into one or more classes and one or more groups dependent on the class based on the channel information, determining a group beamforming matrix for each of the one or more groups, performing group beamforming transmission on terminals belonging to each of the one or more groups based on the group beamforming matrix, obtaining single user-channel quality indicator (SU-CQI) information and interference signal information of each of the terminals belonging to each of the one or more groups, and scheduling the terminals based on the SU-CQI information and the interference signal information.

19 Claims, 4 Drawing Sheets

(30) Foreign Application Priority Data

| Mar. 19, 2013 | (KR) | 10-2013-0029396 |
| Apr. 10, 2013 | (KR) | 10-2013-0039322 |
| Apr. 25, 2013 | (KR) | 10-2013-0046271 |
| May 13, 2013 | (KR) | 10-2013-0053515 |
| May 21, 2013 | (KR) | 10-2013-0057252 |
| Sep. 2, 2013 | (KR) | 10-2013-0105108 |
| Mar. 5, 2014 | (KR) | 10-2014-0026126 |

(51) Int. Cl.
*H04B 7/0456* (2017.01)
*H04B 7/0452* (2017.01)
*H04B 7/04* (2017.01)
*H04B 7/06* (2006.01)

(52) U.S. Cl.
CPC ......... *H04B 7/0456* (2013.01); *H04B 7/0486* (2013.01); *H04B 7/063* (2013.01); *H04B 7/0617* (2013.01); *H04B 7/0639* (2013.01)

(56) References Cited

U.S. PATENT DOCUMENTS

| 2008/0132281 | A1* | 6/2008 | Kim | H04B 7/063 455/562.1 |
| 2008/0247475 | A1* | 10/2008 | Kim et al. | 375/260 |
| 2009/0046569 | A1* | 2/2009 | Chen | H04L 1/0029 370/203 |
| 2009/0316809 | A1* | 12/2009 | Chun et al. | 375/260 |
| 2009/0323849 | A1* | 12/2009 | Bala | H04B 7/0417 375/267 |
| 2010/0035555 | A1* | 2/2010 | Bala | H04B 7/024 455/63.1 |
| 2010/0246527 | A1* | 9/2010 | Montojo et al. | 370/330 |
| 2010/0303034 | A1* | 12/2010 | Chen et al. | 370/329 |
| 2011/0009125 | A1* | 1/2011 | Shin et al. | 455/452.1 |
| 2011/0176484 | A1* | 7/2011 | Vitthaladevuni et al. | 370/328 |
| 2011/0176629 | A1* | 7/2011 | Bayesteh | H04B 7/0417 375/267 |
| 2011/0200081 | A1* | 8/2011 | Guo et al. | 375/224 |
| 2012/0113897 | A1* | 5/2012 | Thiele et al. | 370/328 |
| 2013/0070722 | A1* | 3/2013 | Li et al. | 370/329 |
| 2013/0072246 | A1* | 3/2013 | Nobukiyo | H04W 72/08 455/512 |
| 2013/0107916 | A1* | 5/2013 | Liu | H04B 7/0452 375/219 |
| 2013/0163544 | A1 | 6/2013 | Lee et al. | |
| 2013/0243110 | A1 | 9/2013 | Skov et al. | |
| 2013/0279425 | A1* | 10/2013 | Balraj | H04B 7/0619 370/329 |
| 2013/0343340 | A1* | 12/2013 | Seo et al. | 370/330 |

OTHER PUBLICATIONS

Adhikary, Ansuman, et al. "Joing spatial division and multiplexing." arXiv preprint arXiv:1209.1402 (2012). (44 pages in English), Jan. 2013.

* cited by examiner

METHOD FOR MULTI-INPUT MULTI-OUTPUT COMMUNICATION IN LARGE-SCALE ANTENNA SYSTEM

CROSS-REFERENCE TO RELATED APPLICATIONS

This application claims priority to Korean Patent Application No. 2013-0025206 filed on Mar. 8, 2013, No. 2013-0026472 filed Mar. 13, 2013, No. 2013-0029396 filed Mar. 19, 2013, No. 2013-0039322 filed Apr. 10, 2013, No. 2013-0046271 filed Apr. 25, 2013, No. 2013-0053515 filed May 13, 2013, No. 2013-0057252 filed May 21, 2013, No. 2013-0105108 filed Sep. 2, 2013, and No. 2014-0026126 filed Mar. 5, 2014 in the Korean Intellectual Property Office (KIPO), the entire contents of which are hereby incorporated by reference.

BACKGROUND

1. Field

Example embodiments of the present invention relate in general to the field of method for a multi-input multi-output (MIMO) communication in a large-scale antenna system and more specifically to a method for MIMO capable of maximizing the frequency efficiency of uplink and downlink while requiring less channel state information in a large-scale antenna MIMO channel environment having an antenna correlation.

2. Description of Related Art

Beyond 4G (B4G) mobile communication needs to be provided with a frequency efficiency ten times higher than that of 4G systems such as 3GPP Long Term Evolution (LTE). As a physical layer technology required to attain the frequency ten times higher than that of 4G systems, network multi-input multi-output (MIMO), interference alignment, relay network, heterogeneous network and large-scale antenna technologies are considered.

The present invention relates to a massive MIMO (or a large-scale antenna) system that is capable of significantly enhancing the frequency efficiency. The existing large-scale antenna system is implemented based on a time division duplex (TDD) scheme. However, when a frequency division duplex (FDD) is used, a great number of reference signals as well as wireless resources for feedback of channel state information are required for a large-scale antenna transmitter to obtain channel state information.

In addition, as more and more users are simultaneously serviced by a large-scale transmitting antenna, the computational complexity in scheduling and precoding is significantly increased when compared to the existing systems.

SUMMARY

Accordingly, example embodiments of the present invention are provided to substantially obviate one or more problems due to limitations and disadvantages of the related art.

Example embodiments of the present invention provide a method for multi-input multi-output (MIMO) transmission suitable for a large-scale antenna system, capable of minimizing degradation of frequency efficiency without increasing the amount of wireless resources required for feedback of channel state information.

Example embodiments of the present invention also provide a method for MIMO reception suitable for a large-scale antenna system, capable of minimizing degradation of frequency efficiency without increasing the amount of wireless resources required for feedback of channel state information.

In some example embodiments, a method for MIMO transmission of a base station in a wireless communication system includes obtaining channel information of one or more terminals; classifying the one or more terminals into one or more classes and one or more groups dependent on the class based on the channel information; determining a group beamforming matrix for each of the one or more groups; performing group beamforming transmission on terminals belonging to each of the one or more groups based on the group beamforming matrix; obtaining single user-channel quality indicator (SU-CQI) information and interference signal information of each of the terminals belonging to each of the one or more groups; scheduling the terminals based on the SU-CQI information and the interference signal information; and transmitting data to the terminals based on the scheduling.

The channel information may include at least one of a transmit correlation matrix, an eigenvalue of the transmit correlation matrix, an eigenvector of the transmit correlation matrix, an angle speed (AS), an angle of departure (AOD) and at least one long period precoding matrix indicator (PMI) selected from a fixed codebook representing channel information.

In the classifying into the one or more groups, terminals having similar transmission correlation matrices to each other may be classified into the same group.

In the classifying into the one or more groups, terminals whose effective eigenvectors of transmission correlation matrices are similar to each other may be classified into the same group; and groups whose effective eigenvectors of transmission correlation matrices have high orthogonality with respect to each other may be classified into the same class.

In the determining of the group beamforming matrix, the group beamforming matrix may be determined through a block diagonalization such that group beamforming matrices of the respective groups are quasi orthogonal to one another based on the channel information and a one-ring channel model.

The interference signal information may include at least one of the intensity of an interference signal between terminals belonging to the group and the intensity of an interference signal with another group.

The interference signal information may be an offset value with respect to the SU-CQI.

The interference signal information may be a channel quality indicator represented as a modulation and coding scheme (MCS).

The interference signal information may be the intensity of an interference signal of a PMI serving as interference with the terminals belonging to the group.

The interference signal information may be a ratio with respect to the SU-CQI.

The scheduling of the terminals includes calculating a multi user-channel quality indicator (MU-CQI) information of each terminal based on a combination of the groups belong to each class, a combination of the terminals belonging to each group and a combination of ranks for each terminal; calculating a sum-proportional fair (PF) metric based on the MU-CQI; selecting a multi user combination having a largest sum-PF metric in each class as a sum-PF metric of the each class; selecting a class having a largest sum-PF metric among all the classes; and determining a multi user combination having the least interference with another multi user combination in the selected class, and scheduling the determined multi user combination.

In the transmitting of the data to the terminals, the data may be transmitted to the terminals through a rank which is different from a rank related to the SU-CQI information and the interference signal information.

In other example embodiments, a method for MIMO of a terminal in a wireless communication system includes: receiving a signal to which a group beamforming matrix of a group including the terminal is applied; generating SU-CQI information and interference signal information by use of a reference signal to which the group beamforming matrix is applied or a reference signal to which the group beamforming matrix is not applied; and feeding back the SU-CQI information and the interference signal information to a base station.

The interference signal information may include at least one of the intensity of an interference signal between terminals belonging to the group and the intensity of an interference signal with another group.

The interference signal information may be an offset value with respect to the SU-CQI.

The interference signal information may be a channel quality indicator represented as an MCS.

The interference signal information may be the intensity of an interference signal of a PMI serving as interference with the terminals belonging to the group.

The interference signal information may be a ratio with respect to the SU-CQI.

In the feeding back of the SU-CQI information and the interference signal information, the terminal may feed back interference signal information which includes a PMI whose inner product with a PMI selected by the terminal is smaller than a predetermined value among PMIs that serve as interference with the terminal.

In the providing of the feedback, the terminal may feed back interference signal information about a sub-band whose interference signal intensity is smaller than a predetermined value among sub-bands.

BRIEF DESCRIPTION OF DRAWINGS

Example embodiments of the present invention will become more apparent by describing in detail example embodiments of the present invention with reference to the accompanying drawings, in which.

DETAILED DESCRIPTION

Figure 1:
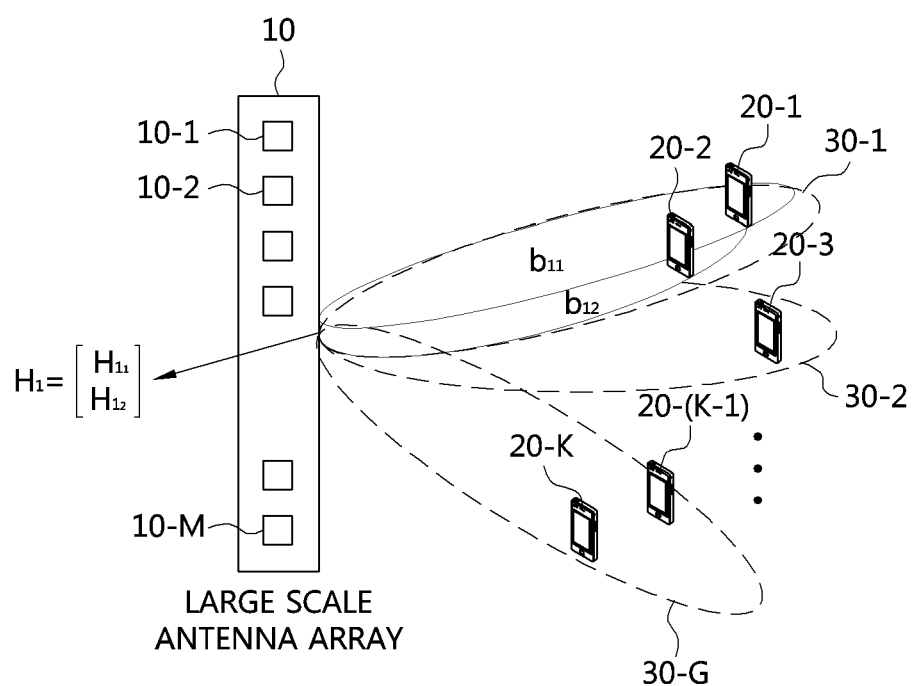
FIG. 1 is a conceptual view explaining a concept of a space divided among user groups in a method for MIMO transmission/reception in accordance with the present invention.

Example embodiments of the present invention are disclosed herein. However, specific structural and functional details disclosed herein are merely representative for purposes of describing example embodiments of the present invention, and example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Throughout the specification, a network may include wireless Internet such as a wireless fidelity (WiFi), portable Internet such as Wireless Broadband (WiBro) Internet or World Interoperability for Microwave Access (WiMAX), a 2G mobile telecommunication network such as Global System for Mobile Communications (GSM) or code division multiple access (CDMA), a 3G mobile telecommunication network such as wideband code division multiple access (WCDMA) or CDMA2000, a 3.5G mobile telecommunication network such as high speed downlink packet access (HSDPA) or high speed uplink packet access (HSUPA), a 4G mobile telecommunication network such as a Long Term Evolution (LTE) or LTE-Advanced network, and a 5G mobile telecommunication network.

Throughout the specification, a terminal may refer to a mobile station, a mobile terminal, a subscriber station, a portable subscriber station, a user equipment or an access terminal, and may include all or partial functions of a mobile station, a mobile terminal, a subscriber station, a portable subscriber station, a user equipment or an access terminal.

A terminal may include a desktop computer, a laptop computer, a tablet PC, a wireless phone, a mobile phone, a smartphone, a smart watch, a smart glass, an e-book reader, a portable multimedia player (PMP), a portable game console, a navigation device, a digital camera, a digital multimedia broadcasting (DMB) player, a digital audio recorder, a digital audio player, a digital picture recorder, a digital picture player, a digital video recorder, and a digital video player that are capable of performing communication.

Throughout the specification, a base station may refer to an access point, a radio access station, a node B, an evolved node B, a base transceiver station, and a mobile multihop relay (MMR)-BS, and may include all or partial functions of an access point, a radio access station, a node B, an evolved node B, a base transceiver station, and an MMR-BS.

An example embodiment of the present invention described below is applied to a field of uplink and downlink of cellular communication. A single cell includes a base station having M antennas and K users (that is, K terminals) each having N antennas. In addition, it is assumed that each terminal has a high correlation of a transmitting antenna, that is, a small angle spread (AS). For example, a transmitting antenna has a high correlation in a downlink urban macro and a channel environment having heavy line of sight (LOS) components.

In addition, the K terminals may be classified into G groups that may be spatially divided based on similarity in the correlation of the transmitting antennas. It is assumed that there are K' terminals in each group.

A channel model considered in accordance with the present invention is expressed as Equation 1 below.

$$H = R_R^{1/2} H_W R_T^{1/2} \quad \text{[Equation 1]}$$

$H_W$ represents an independently and identically distributed (i.i.d.) channel matrix, $R_T$ is a transmit correlation matrix, and $R_R$ a receive correlation matrix. For the sake of convenience of description, it is assumed that $R_R=I$ in the case in which a one-ring channel model in a multi user multi-input multi-output (MIMO) is considered. That is, the reception correlation is not considered.

A transmission signal model in accordance with the present invention is expressed as Equation 2 below.

$$x = BPd \quad \text{[Equation 2]}$$

B is a beamforming matrix based on statistical characteristics of a channel, P is a precoding matrix based on instantaneous channel information $\tilde{H}=HB$, and d is a data symbol vector.

A reception signal model suggested in accordance with the present invention is expressed as Equation 3 below.

$$y = HBPd + z \quad \text{[Equation 3]}$$

z is a noise signal and HB is expressed as Equation 4 below.

$$HB = \begin{bmatrix} H_1 B_1 & H_1 B_2 & \cdots & H_1 B_G \\ H_2 B_1 & H_2 B_2 & \cdots & H_2 B_G \\ \vdots & \vdots & \ddots & \vdots \\ H_G B_1 & H_G B_2 & \cdots & H_G B_G \end{bmatrix} \approx \quad \text{[Equation 4]}$$

$$\begin{bmatrix} H_1 B_1 & 0 & \cdots & 0 \\ 0 & H_2 B_2 & \cdots & 0 \\ \vdots & \vdots & \ddots & \vdots \\ 0 & 0 & \cdots & H_G B_G \end{bmatrix}$$

$H_g$ is a matrix of the entire channel of a group g, and $B_g \in \mathbb{C}^{M \times b}$ is a beamforming matrix of the group g. The approximation sign of Equation 4 is implemented when Equation 5 below is satisfied.

$$H_m B_n = 0, m \neq n \quad \text{[Equation 5]}$$

Accordingly, $P = \text{diag}(P_1, \ldots, P_G)$.

The method for MIMO transmission/reception suggested in accordance with the present invention has a main feature that $B_g$ is set to satisfy the condition of Equation 5, and terminals having the beamforming matrix are concurrently scheduled.

Hereinafter, dimension reduction of an instantaneous channel matrix obtained through the method for MIMO transmission/reception suggested in accordance with the present invention will be described. First, it is assumed that indexing is achieved as shown in Equation 6 below to express group indexes of K terminals.

$$g_k = (g-1) \times K' + k, g = 1, \ldots, G, k = 1, \ldots, K' \quad \text{[Equation 6]}$$

FIG. 1 is a conceptual view explaining a concept of a space divided among user groups in a method for MIMO transmission/reception according to the present invention.

Referring to FIG. 1, a base station may have a large scale antenna array 10 including M antenna elements 10-1, 10-2, . . . and 10-M. K active terminals 20-1, 20-2, . . . and 20-K exist, and the K active terminals 20-1, 20-2, . . . and 20-K may be classified into G groups. For example, a first group 30-1 may include a first terminal 20-1 and a second terminal 20-2, and a second group 30-2 may include a third terminal 20-3. A Gth group 30-G may include a K−1th terminal 20-(K−1) and a Kth terminal 20-K.

In this case, the first group 30-1 including the first terminal 20-1 and the second terminal 20-2 has a channel matrix $H_1$.

Hereinafter, design of a codebook in accordance with the present invention will be described.

A fixed codebook includes T classes and G groups belonging to each class. The number of groups belonging to each class may be different. A matrix $U_g^{(t)}$ forming an eigenvector space of a group forming a single class is obtained through a one ring channel model. Parameters required to form the matrix include an angle spread (AS) and an angle of departure (AOD) of a group. An AS of a group is determined by AS distribution of terminals in a cell, and an AOD of a group is determined by comprehensively considering the following criteria:

Eigenvector spaces of respective groups are set as quasi orthogonal to each other as possible. This serves to reduce interference between groups.

An AOD of each group is set to be distributed as uniform as possible to minimize mismatch between an eigenvector space of a terminal and an eigenvector space of a group to which the terminal belongs.

Block diagonalization is applied to a $U_g^{(t)}$ set of each class obtained as the above, to generate a beamforming matrix $B_g^{(t)}$ forming a codebook. In this manner, interference between groups is further reduced. The beamforming matrix $B_g^{(t)}$ may be used as a long period (or wide-band) precoding matrix indicator (PMI) or a short period (or sub-band) PMI. That is, a terminal may find a beamforming matrix $B_g^{(t)}$ that is optimized for the terminal, and feed back the beamforming matrix $B_g^{(t)}$ at a short period.

Hereinafter, scheduling of MU-MIMO in accordance with the present invention will be described.

Conventional MU-MIMO scheduling is performed by obtaining a sum-proportional fair (PF) metric with respect to a combination of terminals so that an optimum combination is found. However, the MU-MIMO scheduling in accordance with the present invention is performed by finding an optimum combination with respect to a combination of groups of each class rather than with respect to individual terminals. In this case, each group is regarded as a virtual sector.

First, a base station determines a terminal having a largest PF metric based on a multi user-channel quality indicator (MU-CQI), and calculates all sum-PF metrics according to a combination of groups for each class. For example, when the number of transmitting antennas is four, a number of sum-PF metrics corresponding to as much as (4,1)+(4,2)+(4,3)+(4,4) are calculated. (M,S) represents the number of combinations when S elements are selected from M elements. Based on this, the base station performs dynamic scheduling on the terminals 1 to 4, and selects an optimum combination of groups for each class. Finally, the base station selects a class having the largest sum-PF metric among T classes, and performs scheduling on terminals belonging to a combination of groups selected from the class.

An MU-CQI feedback scheme enabling the MU-MIMO scheduling described above is as follows.

Each terminal may provide a base station with feedback corresponding to the intensity of an interference signal between terminals in a group and the intensity of an interference signal with another group. For example, when the number of transmitting antennas is four and the number of groups is four, there is no interference between terminals in a group since each group uses a single beamforming vector, and thus SU-CQI is expressed through Equation 7 below.

$$SU-CQI_k = \max_{t,g} \frac{|h_k^H B_g^{(t)}|^2}{\sigma_k^2} \qquad \text{[Equation 7]}$$

$\sigma_k^2$ represents the intensity of background noise and an interference signal with another cell. The intensity of interference signals with respect to three groups other than a group having a terminal is expressed as Equation 8 below.

$$\left\{ \sum_{g' \in S_s(n), g' \neq g} |h_k^H B_{g'}^{(t)}|^2 : g' = 1, \ldots, 4, g' \neq g \right\} \qquad \text{[Equation 8]}$$

Meanwhile, in order to reduce the number of feedback bits, the intensity of an interference signal is expressed as an offset with respect to SU-CQI.

Such a method of a base station calculating MU-CQI by feeding back the intensity of interference signal is not limited to the MU-MIMO in accordance with the present invention, and may be applied to a conventional LTE scheme. For example, in the Rel 8 codebook and the 8-Tx type double codebook, the base station is fed back SU-CQI of each terminal and intensities of interference signals with all the other terminals, so that the base station may precisely calculate the MU-CQI.

In this case, the base station may reduce the number of feedback bits by putting a restriction on the scheduling to reduce the number of combinations of terminals. In the Rel 8 codebook, when a $k^{th}$ terminal selects PMI $W_i$ of the $k^{th}$ terminal, the remaining 15 PMIs are associated with other terminals. Accordingly, the terminal may feed back the intensities of interference signals of 15 PMIs that serve as interference with the terminal itself (see Equation 9 below) and the SU-CQI described above, and based on the feedback, the base station calculates the MU-CQI to simultaneously perform scheduling on a maximum of four users.

$$\{|H_k^H W_j|^2 : j=1, \ldots, 16, j \neq i\} \qquad \text{[Equation 9]}$$

In the following description, a filtering process of a reception minimum mean square error (MMSE) of a terminal is omitted. In this case, the MU-CQI is expressed as Equation 10 below.

$$MU-CQI_k = \max_i \frac{|H_k^H W_i|^2}{\sigma_k^2 + \sum_{j \neq i} |H_k^H W_j|^2} \qquad \text{[Equation 10]}$$

In the Rel 8 codebook, the above interference signal includes interference signals with respect to the 15 PMIs other than the PMI selected by the terminal. In order to reduce a burden of such feedback, the terminal may feed back only some PMI interference signals among the 15 PMI interference signals. For example, each terminal may feed back a PMI whose absolute value of an inner product with the selected PMI is smaller than a predetermined threshold value among the 15 PMIs and feed back the PMI, and the base station performs scheduling only using the combination of the feedback. The threshold value may be set to 0.3 in the Rel 8 codebook. In this case, the terminal may feed back 5 to 9 interference signals among 15 PMIs according to its selection. The method of reducing a burden of feedback of interference signals is not limited to the Rel 8 codebook, and may be applied to other codebooks.

In order to calculate the MU-CQI using the feedback of the interference signal intensity, the base station needs to receive the intensity of an interference signal of another cell $\sigma_k^2$ in addition to the SU-CQI. However, if the intensity of a modified interference signal shown in Equation 11 is fed back, the base station does not need to feed back an additional $\sigma_k^2$.

$$\frac{|H_k^H W_j|^2}{\sigma_k^2} \qquad \text{[Equation 11]}$$

As the intensity of the modified interference signal is subjected to quantization and fed back, the base station may further precisely estimate the MU-CQI. The detailed description thereof is as follows. A process of representing the MU-CQI as a fraction of SU-CQI is expressed as Equation 12 below.

$$MU - CQI = \frac{S}{2I + I_A} = \frac{\frac{S}{I}}{2 + \frac{I_A}{I}} = \frac{SU - CQI}{2 + \frac{I_A}{I}} = \alpha \times SU - CQI \quad \text{[Equation 12]}$$

S represents a signal of the PMI selected by the terminal, I is an interference signal between cells, $I_A$ is an interference signal between terminals due to $PMI_A$ other than the PMI selected by the terminal, and a is a variable expressing the MU-CQI as a fraction of an SU-CQI. The feedback of a terminal in accordance with the present invention is achieved not by directly providing an MU-CQI that is expressed as a fraction of SU-CQI, but by providing $$\frac{I_A}{I}$$

expressed as a fraction of SU-CQI as shown in Equation 13.

$$\frac{I_A}{I} = \beta \times SU - CQI \quad \text{[Equation 13]}$$

According to such feedback, the base station may estimate MU-CQIs with respect to all combinations of 2 to 4 users. For example, the base station may estimate MU-CQIs due to $PMI_A$ and $PMI_B$ based on $$\frac{I_A}{I} \text{ and } \frac{I_B}{I}$$

received from the terminal through Equation 14 below.

$$MU - CQI = \frac{SU - CQI}{3 + \frac{I_A}{I} + \frac{I_B}{I}} \quad \text{[Equation 14]}$$

The difference between the two feedback schemes described above is as follows. In the former, a has a dynamic range depending on the SU-CQI of a terminal, which causes difficulty in quantization, and thus a precise MU-CQI is not easily expressed. Meanwhile, the latter β has a dynamic range independent of the SU-CQI of a terminal, which facilitates the quantization, and thus the base station may precisely estimate MU-CQI based on the feedback. Meanwhile, in the former, the dynamic range is affected by the SU-CQI. Therefore, a mapping table of a corresponding to a plurality of dynamic ranges according to the SU-CQI is defined, and shared between the base station and the terminal so as to estimate a further precise MU-CQI. However, such a scheme increases the burden of feedback.

The intensity of inference signal $$\frac{|H_k^H W_j|^2}{\sigma_k^2}$$

described above is fed back in the form of a CQI represented as a modulation and coding scheme (MCS) level. Such a CQI with respect to the interference PMI is referred to as an interference CQI. In this case, in order to achieve the same effect as a multi-user interference indicator (MUI) β, an MCS level lower than a range of an MCS level table provided by conventional LTE (that is, outside of the MCS level) needs to be segmented by defining a low MCS level. Such an additional MCS level is required for MU-MIMO of terminals that have a middle or low level of MCS. That is, an interference CQI level with respect to a terminal having a middle or low level of MCS may be highly likely to have a signal to interference plus noise ratio (SINR) lower than a range of conventional MCS levels. Accordingly, in order to feed back a precise intensity of interference signal, a low level of MCS need to be additionally defined to express a low SINR below the range of conventional MCS levels. For example, according to a range of conventional MCS levels, an SINR of −5 dB outside the range is expressed in its totality, while SINRs between −5 dB and −15 dB may be expressed by several stages according to an additional MCS level, and thus the intensity of interference signal is precisely expressed.

Meanwhile, the feedback of interference signal intensity described above may be applied to a method for feedback of MU-CQI using an interference measurement resource (IMR). In this case, an IMR with respect to a plurality of MU hypotheses may be set in plural numbers in units of sub frames, and also may be set in plural numbers in units of sub-bands so as to reduce delay of MU-channel state information (CSI) feedback.

Meanwhile, when the feedback transmission of a terminal is performed with respect to all the sub-bands, the MU-MIMO performance is improved, but the burden of uplink feedback is increased. In order to prevent the burden, a predetermined threshold value is set for the intensity of interference signal, and if intensities of all interference signals in a certain sub-band exceed the predetermined threshold value, the terminal determines that the interference signals are significantly large and are not suitable for MU-MIMO, and does not feed back the interference signals with respect to the sub-band.

The method for feedback reduction described above may be applied to a case in which feedback of MU-CQI is achieved with respect to each sub-band.

A precoding matrix of SU-MIMO according to the present invention includes $B_g$ and $P_g$. The precoding matrix having such a structure approximates a singular value decomposition (SVD) according to the relation shown in Equation 15 below.

$$\underset{N \times M}{H^H} = \underset{N \times N}{U_H} \underset{N \times N}{\Lambda_H} \underset{N \times M}{V_H^H} \quad (SVD) \quad \text{[Equation 15]}$$

$$= \underset{G}{W \Lambda U^H} = U_G \Lambda_G V_G^H U^H \quad (KLD)$$

$$\Rightarrow \underset{M \times N}{V_H} = \underset{\underset{long\text{-}term}{M \times r}}{U} \underset{\underset{short\text{-}term}{r \times N}}{V_G} \approx BP$$

That is, an SVD precoding matrix is divided into a long period part and a short period part. A beamforming matrix B having a significantly long period has almost no burden of feedback, and thus when the same amount of feedback resources is assumed, the SU-MIMO precoding matrix according to the present invention may produce a short period precoding matrix P. Accordingly, a codebook for rank 2 or above is generated as the above.

Feedback for MU-MIMO

A method for flexible MIMO feedback in accordance with the present invention is characterized in that a terminal does not directly calculate MU-CQI for feedback, but feeds back the intensity of interference signal such that a base station estimates MU-CQI through a combination of various terminals. Accordingly, each terminal feeds back SU-CQI, the intensity of interference signal between terminals and the intensity of interference signals with another group. The intensity of an interference signal may be referred to as an MUI. For the sake of convenience of description, the following description is made on the assumption that the number of terminal antennas is 1, and transmission rank 1 of a terminal is expressed as Equation 16 below.

$$SU - CQI = \max_{i} \frac{|h_k^H w_i|^2}{\sigma_k^2} \quad \text{[Equation 16]}$$

$\sigma_k^2$ represents the intensity of background noise and an interference signal due to another cell. Meanwhile, when a subset of PMIs that may be paired with a PMI $w_i$ selected by a terminal is S, an MUI due to a PMI $w_a$, $a \neq i$ belonging to S may be defined as a ratio with respect to the intensity of interference signal between cells.

$$MUI_a = \frac{|h_k^H w_a|^2}{\sigma_k^2}, a \in S, \quad \text{[Equation 17]}$$

In order to reduce the number of feedback bits, an MUI may be represented as a ratio with respect to SU-CQI and then fed back. That is, the feedback MUI information is provided as a quantization of $$\frac{MUI_a}{SU - CQI} = \frac{|h_k^H w_a|^2}{|h_k^H w_i|^2} < 1.$$

The quantization may be performed in 2 bits, and in order to reduce a burden regarding feedback of a sub-band MUI, the quantization may be performed using 1 bit offset with respect to a wide-band MUI.

A physical uplink shared channel feedback (PUSCH) mode in accordance with the present invention feeds back SU-CQI and a plurality of MUIs. By using such feedback, the base station may estimate the MU-CQI. For example, the same transmission power is allocated to each of two terminals, MU-CQI due to PMI $w_a$ may be calculated as Equation 18 below.

$$MU - CQI_a = \frac{|h_k^H w_i|^2}{2\sigma_k^2 + |h_k^H w_a|^2} \quad \text{[Equation 18]}$$

-continued
$$= \frac{\frac{|h_k^H w_i|^2}{\sigma_k^2}}{2 + \frac{|h_k^H w_a|^2}{\sigma_k^2}}$$

$$= \frac{SU - CQI}{2 + MUI_a}$$

When three terminals are subjected to pairing, MU-CQI due to PMI $w_a$, $w_b$ may be calculated as Equation 19 below.

$$MU - CQI_{a,b} = \frac{SU - CQI}{3 + MUI_a + MUI_a} \quad \text{[Equation 19]}$$

The same principle is applied to a case in which four terminals are subjected to paring.

Meanwhile, a terminal which has SU-CQI similar to two orthogonal PMIs and an MUI similar to different PMIs in a set of PMIs of rank 1, rather than PMIs of an upper rank defined in the conventional 1 LTE codebook, may perform rank 2 transmission only through SU-CQI and an MUI of rank 1. Symmetry to rank 2 is expressed as Equation 20 below.

$$H_k^H W = H_k^H [w_1 w_2] \approx \alpha \begin{bmatrix} 1 & \delta \\ \delta & 1 \end{bmatrix} \quad \text{[Equation 20]}$$

In this case, MMSE reception vectors with respect to a first PMI and a second PMI are expressed as Equation 21.

$$g_1 \approx \begin{bmatrix} 1 \\ 0 \end{bmatrix}, \quad g_2 \approx \begin{bmatrix} 0 \\ 1 \end{bmatrix} \quad \text{[Equation 21]}$$

That is, one of three PMIs orthogonal to a PMI of rank 1 of a terminal may become a second PMI of rank 2. When the terminal, through a wide-band or sub-band mode, provides a base station with feedback information about a second PMI having such symmetry (for example, 2 bits of information identifying one of the three PMIs orthogonal to the rank 1 PMI) and a rank indicator), representing that two PMIs have the symmetric relation described above, the base station determines the information and performs rank 2 transmission. An MUI with respect to the orthogonal two PMIs ($w_3$, $w_4$) other than the second PMI is expressed as four values using the MMSE reception vector described above (see Equation 22).

$$g_1^H H_k^H w_3, g_2^H H_k^H w_3, g_1^H H_k^H w_4, g_2^H H_k^H w_4 \quad \text{[Equation 22]}$$

The terminal may feed back the MUI in a wide-band or sub-band mode. In this case, two SU-CQIs for the rank 2 transmission are the same, and may be calculated in the same way as the MU-CQI (see Equation 23 below).

$$\text{rank-}2 SU - CQI = \frac{\text{rank-}1 SU - CQI}{2 + MUI} \quad \text{[Equation 23]}$$

In addition, the feedback scheme described above provides a flexible MU-MIMO pairing that enables each paired terminal to have rank 1 or rank 2. For example, two terminals each having rank 2 may be paired.

The MUI feedback described above has the following features.

1) Transparent Rank 2 Transmission and a Pairing of Two Rank 2 Terminals Through Rank 1 Feedback Even when terminal feedback is performed through rank 1, the base station may calculate MU-CQI of rank 2 transmission through an MUI, so that rank 2 transmission may be performed. Accordingly, a base station may perform rank 2 transmission by adding MUI feedback without rank 2 feedback. In addition, in the same way, a base station may flexibly perform scheduling using only rank 1 feedback information. For example, a base station may pair two rank 2 terminals with each other, or pair one rank 2 terminal with two rank 1 terminals.

1) Saving of Demodulation Reference Signal (DM-RS) Resources

Since a base station may find precise interference between terminals with respect to a predetermined terminal pairing through an MUI, the base station may allow terminals having a significantly small MUI to share the same DM-RS resources without an additional control signal. If necessary, the base station may vary a scrambling identity (SCID) among the terminals.

Meanwhile, an alternative to the MUI feedback scheme for rank 2 MU-MIMO will be described below. The following description will be made in view of the LTE Rel-8 4-Tx codebook and two receiving antennas of a terminal, but the feedback scheme in accordance with the present invention is not limited to a certain form of an antenna or codebook.

Rank 2 SU-CQIs with respect to a layer 1 and a layer 2 are defined as in Equation 24 below.

$$SU-CQI_1 = \frac{|g_{k(1)}^H H_k w_{i(1)}|^2}{\sigma_k^2 + |g_{k(1)}^H H_k w_{i(2)}|^2},$$

$$SU-CQI_2 = \frac{|g_{k(2)}^H H_k w_{i(2)}|^2}{\sigma_k^2 + |g_{k(2)}^H H_k w_{i(1)}|^2}$$

[Equation 24]

$W_i = \lfloor w_{i(1)}, w_{i(2)} \rfloor$ represents a PMI with respect to rank 2 selected by a terminal K, and $g_{k(1)}$ and $g_{k(2)}$ represent reception filter coefficients of the terminal with respect to the layer 1 and the layer 2. When the feedback scheme in accordance with the present invention is described, a CQI omitting interference between layers, unlike the SU-CQI described above, is referred to as a single layer (SL)-CQI, and is defined as Equation 25 below.

$$SL-CQI_1 = \frac{|g_{k(1)}^H H_k w_{i(1)}|^2}{\sigma_k^2},$$

$$SL-CQI_2 = \frac{|g_{k(2)}^H H_k w_{i(2)}|^2}{\sigma_k^2}$$

[Equation 25]

MUI of the layer 1 due to PMI $w_a$ is defined again as Equation 26 below.

$$MUI_{1,a} = \frac{|g_{k1}H_k^H w_a|^2}{\sigma_k^2}, a \in S$$

[Equation 26]

By use of the above defined feedback, rank1/rank2 MU-MIMO is flexibly supported. For the sake of convenience of description, it is assumed that all terminals each have a rank 2 and perform CSI feedback of a rank 2. First, MU-CQI of a terminal k with respect to a layer 1 due to pairing of two terminals is expressed as Equation 27 below.

$$MU-CQI_1 = \frac{|g_{k(1)}^H H_k w_{i(1)}|^2}{4\sigma_k^2 + |g_{k(1)}^H H_k w_{i(2)}|^2 + |g_{k(1)}^H H_k w_{j(1)}|^2 + |g_{k(1)}^H H_k w_{j(2)}|^2}$$

$$= \frac{SL-CQI_1}{4 + MUI_{1,i(2)} + MUI_{1,j(1)} + MUI_{1,j(2)}}$$

[Equation 27]

$W_j = \lfloor w_{j(1)}, w_{j(2)} \rfloor$ represents a rank 2 PMI selected by another terminal that is paired with the terminal k. Even when a terminal performs feedback through rank 2, some terminals may receive rank 1 transmission to enhance the transmission efficiency in a system in terms of a scheduling of a system. In this case, the feedback described above enables stable link adaptation through precise MU-CQI. For example, MU-CQI of a terminal k due to pairing of three terminals that select PMIs $w_{i(2)}, w_{j(1)}, W_l = \lfloor w_{l(1)}, w_{l(2)} \rfloor$ is expressed through Equation 28 below.

$$MU-CQI = \frac{|g_{k(2)}^H H_k w_{i(2)}|^2}{4\sigma_k^2 + g_{k(2)}^H H_k w_{j(1)}|^2 + |g_{k(2)}^H H_k w_{l(1)}|^2 + |g_{k(2)}^H H_k w_{l(2)}|^2}$$

$$= \frac{SL-CQI_2}{4 + MUI_{2,j(1)} + MUI_{2,l(1)} + MUI_{2,l(2)}}$$

[Equation 28]

Meanwhile, the MU-CQI may exhibit different values between feedback $g_{k(2)}$ and modulation $g_{k(2)}$, causing a slight error. However, such an error may be underestimated and exert a significantly small influence on the system performance.

In the MUI feedback scheme described above in which an MUI is provided in units of sub-bands, a burden of uplink resources may be great. One example of reducing the feedback burden is achieved by adding 1 bit of information that enables/disables an MUI based on each sub-band and layer. The additional information is referred to as MUI_Enb. A condition for disabling MUI feedback of a certain sub-band of a certain layer is that one (or all) of candidate PMIs belonging to a set S of a certain layer with respect to a terminal has interference exceeding a predetermined threshold value. The threshold value may be adjusted through a system control signal (higher-layer signaling) or defined in standards of terminals. For example, when a set S is defined as orthogonal PMIs, the number of orthogonal candidate PMIs for pairing is limited to 2 as shown in Table 1 below. Table 1 shows MU-PMIs orthogonal to PMIs of rank 2.

TABLE 1

| SU-PMI | $W_1$ | $W_2$ | $W_3$ | $W_4$ | $W_5$ | $W_6$ | $W_7$ | $W_8$ |
|---|---|---|---|---|---|---|---|---|
| MU-PMI | $w_{3(1)},$ $w_{11(2)}$ | $W_4$ | $W_9$ | $W_2$ | $w_{7(1)}$ | $w_{8(1)}$ | $W_8$ | $W_7$ |
| SU-PMI | $W_9$ | $W_{10}$ | $W_{11}$ | $W_{12}$ | $W_{13}$ | $W_{14}$ | $W_{15}$ | $W_{16}$ |
| MU-PMI | $W_3$ | $w_{2(1)},$ $w_{4(2)}$ | $W_{12}$ | $W_{11}$ | $W_{16}$ | $W_{15}$ | $W_{14}$ | $W_{13}$ |

The orthogonal candidate PMIs include PMIs that are equivalent except for shifted phases. For example, $w_{11(2)}=-w_{9(1)}$ and the two PMIs are equivalent. In addition, $w_{9(1)}=w_9$. A scheduler needs to find the optimum combinations of terminals and PMIs in consideration of all the equivalent PMIs. MUI_Enb may be set to be different at each sub-band and each MU-PMI (instead of each layer).

In addition, another benefit of using MUI_Enb is provided when an MUI is quantized in 2 bits. In this case, since MUI_Enb serves to indicate deviation from a range of an MUI, fourth level quantization is performed in practice rather than third level quantization, which results in more precise quantization. In other cases when quantization is performed in 1 bit, second level quantization is performed in practice. Accordingly, the 1 bit quantization may also be used without significantly degrading performance. Meanwhile, when MUI_Enb is disabled, a conventional SU-CQI with respect to rank 2 needs to be fed back instead of the SL-CQI described above as a sub-band CQI of a terminal.

Another example of reducing the feedback burden is achieved by a delayed MUI feedback scheme that is to be described below. First, a base station receives a conventional SU-CSI, in particular, a PMI from each terminal, and determines which interference PMI is able to be used by a terminal that is to be paired in practice. Alternatively, a base station may select a certain interference PMI and instruct the terminal to perform feedback regarding the interference PMI. In this manner, the base station, through downlink control information, notifies each terminal of which interference PMI needs to be subjected to feedback among interference PMIs. Accordingly, each terminal may feed back an MUI only related to an interference PMI that may be used by another terminal in practice. Such a scheme may be applied to a CSI-RS based MU-CQI.

Meanwhile, the MUI feedback scheme in accordance with the present invention may be applied to CSI-RS based MU-CQI and CSI-IM (channel state information-interference measurement) based MU-CQI as a substitution for MU-CQI.

1) PMI in 2D Array

Rel. 11 has a plurality of feedback modes that support different transmission, for example, wide-band/sub-band PMIs, to adjust the granularity of a frequency-domain and a feedback overhead. When this concept is extended to a two-dimensional antenna array, a PMI feedback mode is divided into horizontal wide-array/sub-array PMIs, and vertical wide-array/sub-array PMIs. The sub-array PMI represents a PMI optimized for each sub-array, and the wide-array PMI represents a PMI that maximizes the sum CQI of all sub arrays.

3D Beamforming

Long period CSI-RS structure: even when a base station has a plurality arrays for each of a horizontal axis and a vertical axis according to a 2-dimensional antenna array, an eigenvector matrix of a terminal, which is a statistical characteristic, is provided as one for each of a horizontal axis and a vertical axis. Accordingly, a long period CSI-RS does not need to be provided for each 2-dimensional antenna element, and may be transmitted as one column for a horizontal axis and one row for a vertical axis.

Short period CSI-RE structure: an eigenvector matrix of a terminal has the structure described above, but the plurality of arrays provided for each of the horizontal axis and the vertical axis may be different from each other in a short period fading channel. Accordingly, the short period CSI-RS needs to be provided with respect to each 2-dimensional antenna element.

Long period PMI feedback: a long period PMI includes a long period PMI (a horizontal axis class and group ID) for a horizontal axis and a long period PMI (a vertical axis class and group ID) for a vertical axis according to the long period CSI-RS.

Short period PMI feedback: a short period PMI may be different at each 2-dimensional antenna element. Accordingly, a plurality of short period PMIs are fed back with respect to a horizontal axis and a plurality of short period PMIs are fed back with respect to a vertical axis. In addition, the short period PMI for a horizontal axis and the short period PMI for a vertical axis may have different feedback periods.

Hereinafter, an example embodiment of the present invention applied to the following system environment will be described.

System Environment

1) Antenna Configuration

Antennas of a base station implementing a large scale antenna MIMO in accordance with the present invention are provided in a total of 32 antennas with co-polarization ULA at an interval of ½λ between antennas. In a 2-dimensional array, the antenna may have a configuration of 8(H)×4(V). H represents a horizontal axis and V represents a vertical axis on a 2-dimensional plane. In addition, the number of antennas of a terminal is limited to 2.

2) Joint Spatial Division and Multiplexing (JSDM) Parameters

JSDM design parameters are defined as follows.

$T_H$, $T_V$: the number of horizontal axis/vertical axis classes
$G_H$, $G_V$: the number of horizontal axis/vertical axis groups
$b_H$, $b_V$: the number of beams of each horizontal axis/vertical axis group A class represents a combination of terminals that may be scheduled using the same physical resource block (PRB). That is, a different class uses different resources. In a 2-dimensional array, the JSDM variables in accordance with the present invention may be defined as follows.

$T_H=2$, $T_V=2$
$G_H=4$, $G_V=2$
$b_H=2$, $b_V=1$

In a 1-dimensional array, the JSDM variables in accordance with the present invention may be defined as follows.

$T_H=4$
$G_H=4$
$b_H=4$

3) Notation $t_H=0, 1, \ldots, T_H-1$; $t_V=0, 1, \ldots$ and $T_V-1$: the horizontal axis/vertical axis class index
$g_H=0, 1, \ldots, G_H-1$; $g_V=0, 1, \ldots$ and $G_V-1$: the horizontal axis/vertical axis group index
$k=0, 1, \ldots$ and $b_H-1$: the horizontal axis beam index
$g_k$: a beam k in a horizontal group g Reference Signal (RS)

An RS in accordance with the present invention needs to accommodate 32 transmitting antennas while maintaining the conventional level of RS overhead according to the system environment described above. In addition, a base station limits the number of layers that are to be scheduled using the same resources to 16 at the maximum, and supports two layers per each terminal at the maximum. The following RS design scheme is described under the assumption that the number of resource elements (REs) of CSI-RS is set to 8, and the number of DM-RS ports is set to 4 at the maximum.

1) CSI-Group Specific Reference Signal (GRS)

Figure 2:
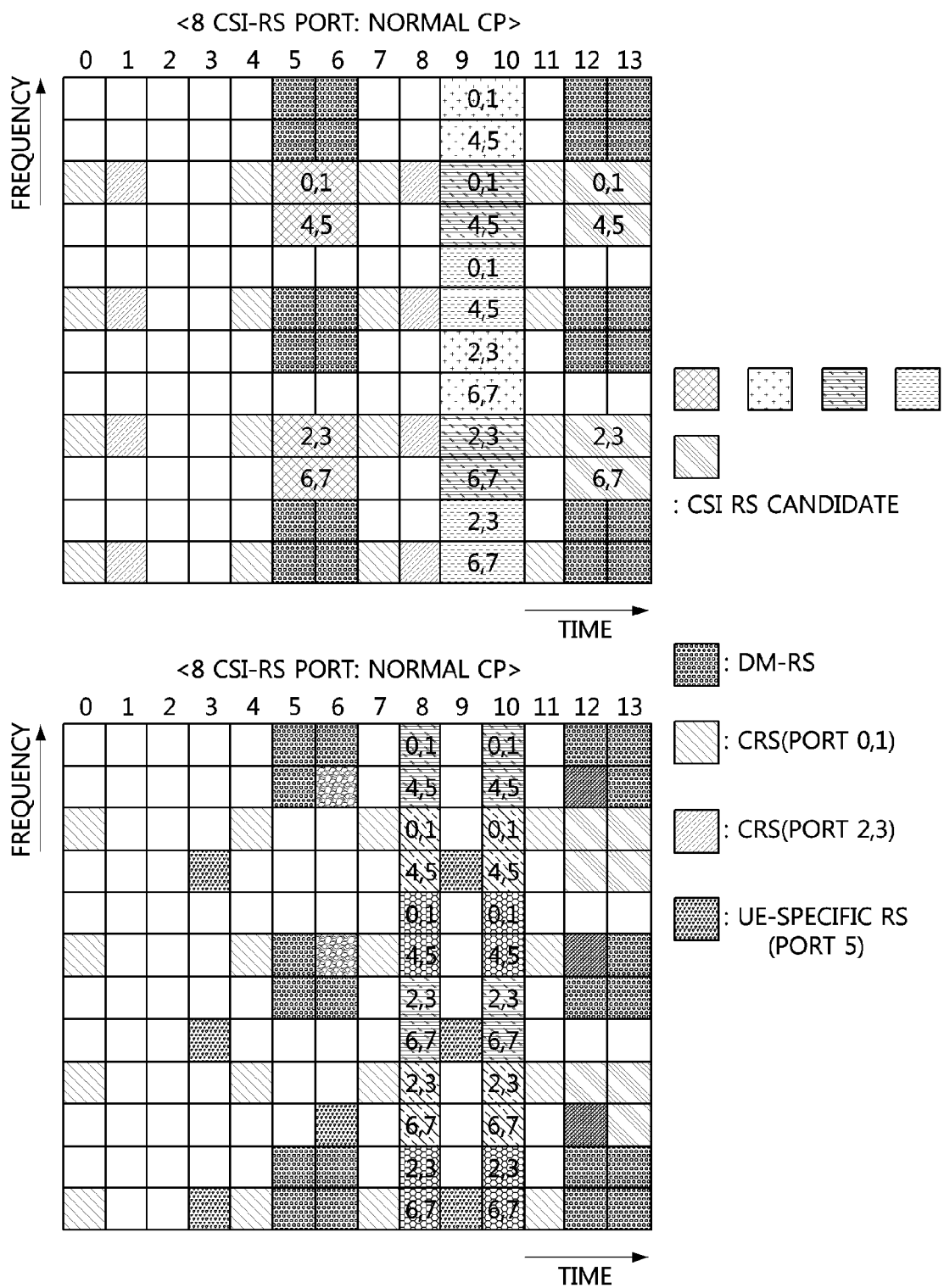
FIG. 2 is a conceptual view illustrating a CSI-RS pattern of an 8 antenna port.

FIG. 2 is a conceptual view illustrating a CSI-RS pattern of an 8 antenna port.

Referring to FIG. 2, a CSI-RS of Rel. 11 is designed such that five 8-Tx CSI-RS antenna ports are accommodated in a single PRB. Meanwhile, when CSI-RSs of 32 antenna ports are accommodated in a single PRB, CSI-RS interference between a power boost and adjacent cells may occur. Accordingly, the CSI-GRS in accordance with the present invention is substituted for the conventional CSI-RS.

RSs that are beamformed using a plurality of beam vectors orthogonal to each other between groups are transmitted while sharing a single RE. According to the JSDM design variables, the number of horizontal/vertical groups is 8, and thus 8 RSs orthogonally beamformed may take a single RE. Accordingly, the 8 antenna port pattern is maintained in the same form as the conventional technology shown in FIG. 2.

In order to prevent CSI-GRSs between adjacent cells from interfering each other due to beam orientation, antenna ports and group IDs between adjacent cells are adjusted (see 'port and group mapping' below), to perform coordinated beamforming such that CSI-GRS beams between adjacent cells are offset.

Meanwhile, in the CSI-GRS, multiple orthogonal precoded CSI-RSs are not easily distinguished. Accordingly, many resources are used to easily distinguish the multiple orthogonal precoded CSI-RSs. In this case, CSI-GRS may be transmitted using the same RE resources that an adjacent cell uses, and in order to mitigate the CSI-GRS interference with adjacent cells, coordinated beamforming needs to be performed through coordination between cells such that CSI-GRS beams of adjacent cells are offset.

Port and Group ID Mapping

An antenna port p is mapped to horizontal axis/vertical axis class indexes and a beam index as shown in Equation 29 below.

$$p = 15 + 4 \cdot t_V + 2 \cdot t_H + k \quad \text{[Equation 29]}$$

Meanwhile, a group ID has a value of $N_{ID}^{GR} = 0, 1, \ldots, G_H \times G_V - 1$, and may be mapped to the horizontal axis/vertical axis group index as shown in Table 2 below.

TABLE 2

| Group ID $N_{ID}^{GR}$ | Corresponding group index $(g_H, g_v)$ |
|---|---|
| 0 | 0, 0 |
| 1 | 1, 0 |
| 2 | 2, 0 |
| 3 | 3, 0 |
| 4 | 0, 1 |
| 5 | 1, 1 |
| 6 | 2, 1 |
| 7 | 3, 1 |

Sequence Generation

A pseudo-random sequence of CSI-GRS is defined again as follows. That is, a reference signal sequence $r_{l,n_s}(m)$ is expressed as Equation 30 below.

$$r_{l,n}(m) = \frac{1}{\sqrt{2}}(1 - 2 \cdot c(2m)) + j\frac{1}{\sqrt{2}}(1 - 2 \cdot c(2m+1)), \quad \text{[Equation 30]}$$

$$m = 0, 1, \ldots, N_{RB}^{max,DL} - 1$$

$n_s$ is a slot number in a radio frame, and l is an OFDM symbol number in a slot. A pseudo-random sequence generator is initialized as Equation 31 at the start of each OFDM symbol.

$$c_{init} = 2^{13} \cdot (7 \cdot (n_s+1) + l+1) \cdot (2^{10} \cdot N_{ID}^{GR} + 2 \cdot N_{ID}^{CSI} + 1) + 2^{10} \cdot N_{ID}^{GR} + 2 = N_{ID}^{CSI} + N_{CP} \quad \text{[Equation 31]}$$

$N_{CP}$ is defined as Equation 32 below.

$$N_{CP} = \begin{cases} 1 & \text{for normal } CP \\ 0 & \text{for extended } CP \end{cases} \quad \text{[Equation 32]}$$

2) DM-RS

In DM-RS in accordance with the present invention, up to 4 layers are accommodated in a single DM-RS port through four different SCIDs, and up to 4 DM-RS ports are provided such that a total of 16 layers are transmitted. A pattern of four orthogonal DM-RSs complies with a DM-RS pattern of rank 4 and an orthogonal cover code (OCC). In this case, layers scheduled to the same port are determined based on feedback information of a terminal as described above.

Sequence Generation

A pseudo-random sequence of DM-RS is defined again as follows. That is, in a certain antenna port $P \in \{7, 8 \ldots, \upsilon+6\}$, a reference signal sequence r(m) is defined as Equation 33 below.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 33]}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

A pseudo-random sequence generator is initialized as Equation 34 at the start of each sub-frame.

$$c_{init} = (\lfloor n_s/2 \rfloor + 1) \cdot (2n_{ID}^{(nSCID)} + 1) \cdot 2^{17} + n_{SCID} \quad \text{[Equation 34]}$$

The amount of $n_{ID}^{(i)} = 0, 1, 2, 3$ is given by $n_{ID}^{(i)} = N_{ID}^{cell}$.

In DCI format 2C-1, $n_{SCID}$ is expressed as in Table 3 below.

Precoding for Spatial Multiplexing

A precoding matrix codebook for spatial multiplexing includes an 8-DFT based horizontal axis (H) codebook and a 4-DFT based vertical axis (V) codebook, and the horizontal axis codebook complies with an 8Tx double codebook structure.

1) Codebook for Rank 1 Transmission

A rank 1 horizontal axis codebook is defined as Equation 35 below.

$$W_{H,g_k}^{(t)} = \frac{1}{\sqrt{8}} v_{H,Ag+2k+t} \quad \text{[Equation 35]}$$

($t=0, 1, \ldots$ and $T_H-1$, $g=0, 1, \ldots, G_H-1$, $k=0, 1, \ldots$ and $b_H-1$)

A DFT beam vector $V_{H,m}$ is defined as Equation 36 below.

$$v_{H,m} = [1\, e^{j2\pi m/16}\, e^{j4\pi m/16}\, e^{j6\pi m/16}\, e^{j8\pi m/16}\, e^{j10\pi m/16}\, e^{j12\pi m/16}\, e^{j14\pi m/16}]^T \quad \text{[Equation 36]}$$

$m=0, 1, \ldots$ and 15

A rank 1 vertical axis codebook is defined as Equation 37 below.

$$W_{V_g}^{(t)} = \tfrac{1}{2} v_{V,2g+t} \quad \text{[Equation 37]}$$

($t=0, 1, \ldots$ and $T_V-1$, $g=0, 1, \ldots$ and $G_V-1$)

A DFT beam vector $v_{V,m}$ is defined as Equation 38 below.

$$v_{V,m} = [1\, e^{j2\pi m/4}\, e^{j4\pi m/4}\, e^{j6\pi m/4}]^T \quad \text{[Equation 38]}$$

($m=0, 1, \ldots$ and 3)

2) Codebook for Rank 2 Transmission

Since the rank 1 codebook is used as a codebook for rank 2 transmission supporting two layers for each terminal according to the CQI feedback described above, no additional rank 2 codebook is defined.

Downlink Control Information (DCI)

In order to support up to 16 layers in accordance with the conventional technology, 16 DM-RS ports are required in practice. When implementing the DM-RS in accordance with the present invention, a base may find terminals or layers having significantly little interference through the MUI described above. Accordingly, even if a base station may allocate the same port and various SCIDs to one or more terminals (or one or more layers) without an additional control signal, DM-RS demodulation is possible and thus the DM-RS resource related burden is reduced.

1) DCI Format 2C-1

The difference between the DCI format 2C-1 supporting an MU-MIMO for 16 layers at the maximum and the conventional DCI format 2C is shown in Table 3 below. The antenna port, $n_{SCID}$, and the number of layers may be expressed in 4 bits. Table 3 shows the antenna port and SCID.

TABLE 3

| A single codeword having a single layer: codeword 0 (enabled), codeword 1 (disabled) | | Two codewords having two layers: codeword 0 (enabled), codeword 1 (enabled) | |
|---|---|---|---|
| Value | Message | Value | Message |
| 0 | port 7, $n_{SCID}=0$ | 0 | ports 7-8, $n_{SCID}=0$ |
| 1 | port 7, $n_{SCID}=1$ | 1 | ports 7-8, $n_{SCID}=1$ |
| 2 | port 7, $n_{SCID}=2$ | 2 | ports 7-8, $n_{SCID}=2$ |
| 3 | port 7, $n_{SCID}=3$ | 3 | ports 7-8, $n_{SCID}=3$ |
| 4 | port 8, $n_{SCID}=0$ | 4 | ports 9-10, $n_{SCID}=0$ |
| 5 | port 8, $n_{SCID}=1$ | 5 | ports 9-10, $n_{SCID}=1$ |
| 6 | port 8, $n_{SCID}=2$ | 6 | ports 9-10, $n_{SCID}=2$ |
| 7 | port 8, $n_{SCID}=3$ | 7 | ports 9-10, $n_{SCID}=3$ |
| 8 | port 9, $n_{SCID}=0$ | 8 | Reserved |
| 9 | port 9, $n_{SCID}=1$ | 9 | Reserved |
| 10 | port 9, $n_{SCID}=2$ | 10 | Reserved |
| 11 | port 9, $n_{SCID}=3$ | 11 | Reserved |
| 12 | port 10, $n_{SCID}=0$ | 12 | Reserved |

TABLE 3-continued

| A single codeword having a single layer: codeword 0 (enabled), codeword 1 (disabled) | | Two codewords having two layers: codeword 0 (enabled), codeword 1 (enabled) | |
|---|---|---|---|
| Value | Message | Value | Message |
| 13 | port 10, $n_{SCID}=1$ | 13 | Reserved |
| 14 | port 10, $n_{SCID}=2$ | 14 | Reserved |
| 15 | port 10, $n_{SCID}=3$ | 15 | Reserved |

2) PMI Definition

A PMI corresponds to $(t_H, t_V, g_H, g_V, k)$, and may be expressed using two PMI indexes. The first PMI index $i_1$ is $i_1 = 2^4 \cdot t_H + 2^3 \cdot t_V + 2 \cdot g_H + g_V$. The second PMI index $i_2$ is $i_2 = k$. In rank 2, the second PMI index $i_2$ is not fed back.

3) MUI Definition

An MUI is information reporting an interference level due to a co-scheduled PMI (Co-PMI) corresponding to a PMI selected by a terminal. All the precoding matrices belonging to a PMI class $(t_H, t_V)$ may serve as targets for the Co-PMI.

Table 4 shown below represents a set of Co-PMIs with respect to a PMI $(t_H, t_V, g_H, g_V, k)$ selected by a terminal. The horizontal/vertical group index with respect to a CO-PMI has the same value as $(t_H, t_V)$ of a PMI, and is thus omitted. In addition, since Co-PMI indexes 1 to 7 corresponding to all groups other than the horizontal/vertical group $(g_H, g_V)$ of the PMI each include two beams belonging to the corresponding group, index k is omitted.

TABLE 4

| PMI | Co-PMI index | Co-PMI (H group, V group, Beam) |
|---|---|---|
| $(g_H, gv, k)$ | 0 | $(g_H, gv, \sim k)$ |
| | 1 | $(G_H, (0), gv)$ |
| | 2 | $(G_H, (0), gv)$ |
| | 3 | $(G_H, (0), gv)$ |
| | 4 | $(0, \sim gv)$ |
| | 5 | $(1, \sim gv)$ |
| | 6 | $(2, \sim gv)$ |
| | 7 | $(3, \sim gv)$ |

$$k = \begin{cases} 0, & \text{if } k=1 \\ 1, & \text{if } k=0 \end{cases}, \quad g_V = \begin{cases} 0, & \text{if } g_V=1 \\ 1, & \text{if } g_V=0 \end{cases}$$

$G_H$ is a subset excluding $g_H$ from a set of all horizontal groups, and may be defined as Equation 39 below.

$$G_H = \{0, \ldots, g_H-1, g_H+1, \ldots, G_H-1\} \quad \text{[Equation 39]}$$

For calculation of an MUI, a virtual extended CQI is defined as in Table 5 below. Such a CQI value is not used in real transmission.

TABLE 5

| CQI index | Modulation | Code rate × 1024 | Efficiency |
|---|---|---|---|
| −4 | Deviation from range | | |
| −3 | BPSK | ? | ? |
| −2 | BPSK | ? | ? |
| −1 | BPSK | ? | ? |
| 0 | QPSK/BPSK | ? | ? |

MUI may be set by a CQI offset and Table 6 below.

CQI values are calculated with respect to respective PMI(s) belonging to a Co-PMI set, and defined as virtual CQIs. Since CO-PMI indexes 1 to 7 each include two beams (or PMI) belonging to the corresponding groups, two interference levels due to the two beams are averaged to form a virtual CQI.

CQI offset represents the difference between a CQI according to PMI and a virtual CQI according to Co-PMI.

CQI offset=CQI−virtual CQI

The CQI offset is mapped to MUI index as shown Table 6 below.

TABLE 6

| MUI index | CQI offset |
|---|---|
| 0 | ≥8 |
| 1 | 6, 7 |
| 2 | 4, 5 |
| 3 | ≤3 |

A terminal may calculate 8 MUIs correspond to the Co-PMI set

4) MU-CQI Estimation Scheme

A flexible MU-CSI feedback scheme in accordance with the present invention is characterized in that a terminal does not directly calculate MU-CQI for feedback, but feeds back the intensity of interference signal such that a base station estimates MU-CQI based on a combination of various terminals. Accordingly, each terminal feeds back CQI (that is, SU-CQI), the intensity of interference signal between terminals and the intensity of interference signal with another group. The intensity of an interference signal may be defined as an MUI. According to the present invention, the number of antennas is assumed to be 2.

Rank 1 Case

A transmission rank 1 CQI of a terminal k is determined by an SINR $\rho_k$ shown in Equation 40 below.

$$\rho_k = \frac{|g_k^H H_k w_k|^2}{\sigma_k^2} \mapsto CQI_k \quad \text{[Equation 40]}$$

$H_k$ is a 2×4 channel matrix, $g_k$ is a reception beamforming vector, and $\sigma_k^2$ represents the intensity of background noise and an interference signal due to another cell. When a set of Co-PMIs that may be paired with a PMI $w_k$ selected by a terminal through MU-MIMO shown in Table 4 is referred to as S, the intensity of interference signals due to PMI $w_a$ belonging to S may be expressed as a virtual CQI shown in Equation 41 using Table 5.

$$\rho_a' = \frac{|g_k^H H_k w_a|^2}{\sigma_k^2} \mapsto \text{virtual } CQI_a, a \in S \quad \text{[Equation 41]}$$

An MUI may be expressed as an offset with respect to CQI as shown in Equation 42 to reduce the number of feedback bits, and may be mapped to an MUI index through Table 6.

CQI offset=$CQI_k$−virtual $CQI_a$,a∈S

CQI offset↦$MTU_a$,a∈S  [Equation 42]

The MUI indexes defined in Table 6 may be interpreted as a power offset value with respect to an effective SNR of CQI due to a selected PMI as shown in Table 7 below.

TABLE 7

| MUI index | CQI offset | Power offset ρ | |
|---|---|---|---|
| 0 | ≥8 | ≤−16 dB | |
| 1 | 6, 7 | −16 < ≤−12 dB | |
| 2 | 4, 5 | −12 < ≤−8 db | |
| 3 | ≤3 | >−8 dB | Out of range |

According to a PUSCH feedback mode in accordance with the present invention, the CQI and a plurality of MUIs are fed back. Through the feedback, the base station may estimate MU-CQI. For example, when the same transmission power is allocated to two terminals, MU-CQI due to a Co-PMI $w_a$ may be calculated through Equation 43 below.

$$\frac{|g_k^H H_k w_k|^2}{2\sigma_k^2 + |g_k^H H_k w_a|^2} = \frac{\rho_k}{2 + \rho_a'} \mapsto MU\text{-}CQI_{k,a} \quad \text{[Equation 43]}$$

When three terminals are paired, MU-CQI due to Co-PMI $w_a, w_b$ may be expressed as Equation 44 below.

$$\frac{|g_k^H H_k w_k|^2}{3\sigma_k^2 + |g_k^H H_k w_a|^2 + |g_k^H H_k w_b|^2} = \quad \text{[Equation 44]}$$

$$\frac{\rho_k}{3 + \rho_a' + \rho_b'} \mapsto MU\text{-}CQI_{k,a,b}, a, b \in S$$

The same principle may be applied to a case in which a maximum of 16 terminals are paired.

A network may estimate each SINR as shown in Equation 45 through the CQI and MUI feedback, and map the estimated SINR to MU-CQI so that MU-MIMO link adaptation and MU-MIMO scheduling are precisely achieved.

[Equation 45]

$$\left.\begin{array}{r}CQI_k \mapsto \hat{\rho}_k \\ MUI_a \mapsto \hat{\rho}_a'\end{array}\right\} \mapsto MU\text{-}CQI_{k,a} \quad \text{[Equation 45]}$$

Rank 2 Case

Meanwhile, an MU-CQI estimation for MU-MIMO including rank 2 is as follows. According to the above definition of a PMI (that is, a codebook for rank 2 transmission in a precoding for spatial multiplexing), a PMI $W_k=[w_{k,1}, w_{k,2}]$ for rank 2 transmission includes two precoding vectors corresponding to second PMIs belonging to a first PMI. In consideration of interference between layers due to the two precoding vectors, a conventional CQI with respect to a layer 1 (or a codeword) having a PMI $w_{k,1}$ is defined as Equation 46 below.

$$\rho_{k,1} = \frac{|g_{k,1}^H H_k w_{k,1}|^2}{\sigma_k^2 + |g_{k,1}^H H_k w_{k,2}|^2} \mapsto CQI_{k,1} \quad \text{[Equation 46]}$$

$g_{k,1}$ is a reception beamforming filter coefficient with respect to the layer 1. In rank 2, unlike the CQI described above, an SINR excluding interference due to a PMI $w_{k,2}$ of a layer 2 is mapped to SL-CQI as shown in Equation 47 below, and the mapped result is reported to a network.

$$\rho_{k,1}^{SL} = \frac{|g_{k,1}^H H_k w_{k,1}|^2}{\sigma_k^2} \mapsto SL\text{-}CQI_{k,1} \qquad \text{[Equation 47]}$$

Using the SL-CQI and an MUI of $w_{k,2}, w_{a,1}, w_{a,2}$ the network may estimate MU-CQI with respect to the layer 1 of a terminal k when two terminals having rank 2 $W_k, W_a$ are MU paired as shown in Equation 48 below.

$$\frac{|g_{k,1}^H H_k w_{k,1}|^2}{4\sigma_k^2 + |g_{k,1}^H H_k w_{k,2}|^2 + |g_{k,1}^H H_k w_{a,1}|^2 + |g_{k,1}^H H_k w_{a,2}|^2} = \qquad \text{[Equation 48]}$$

$$\frac{\rho_{k,1}^{SL}}{4 + \rho_{k,2}' + 2\rho_a'} \mapsto MU\text{-}CQI_{k,1}$$

MUI with respect to a Co-PMI $w_a$ of a terminal belonging to another group is an average value of inter-group interference due to $w_{a,1}, w_{a,2}$ described above. Accordingly, the following relation shown in Equation 49 is established.

$$\rho_a' = \frac{|g_{k,1}^H H_k w_{a,1}|^2 + |g_{k,1}^H H_k w_{a,2}|^2}{2\sigma_k^2} \qquad \text{[Equation 49]}$$

An MUI of interference due to another group is expressed as an average value since $w_{a,1}, w_{a,2}$ of a Co-PMI $w_a$ of the corresponding interference groups have similar orientations and thus exhibit similar interference levels.

As described above, using CQI (that is, SL-CQI) and an MUI, the network may estimate various combinations of MU-CQIs having ranks 1 and 2 mixed up to 16 layers.

Meanwhile, an MU-MIMO operation with respect to a cross-polarization (X-pol) antenna array exhibits a complicated form due to co-phasing factors of a codebook, but the operation principle of cross-polarization described above may be extended to X-pol. For example, as co-phasing factors of QPSK are classified into four classes, the orthogonality of precoding matrices in each class may be secured.

4) Feedback Mode

A codebook and CSI feedback in accordance with the present invention are designed to suit an MU-MIMO scheme. Meanwhile, when the number of terminals within a cell is significantly small, SU-MIMO is beneficial in terms of the frequency efficiency. Accordingly, a codebook having high granularity to suit the SU-MIMO is defined, and a new feedback mode is set. A base station may change a feedback mode using higher-layer signaling such that a terminal provides feedback through an SU-MIMO or MU-MIMO. In this case, by allowing a codebook for MU-MIMO to become a sub-set of an SU-MIMO codebook, the MU-MIMO feedback may be regarded as sub-sampling of the SU-MIMO codebook.

Scheduling

Conventional MU-MIMO scheduling represents a computational complexity that may be handled by a network based on the brute-force algorithm when it is assumed that the number of terminals per cell is 10. However, in a massive MIMO system, the number of terminals per cell is larger than 10. For example, when it is assumed that the number of terminals per cell is 30, and the number of layers concurrently transmitted is 16 at the maximum, sum-PF metrics with respect to all combinations of $$\sum_{i=1}^{16} \binom{30}{i}$$

need to be calculated, and thus the computational complexity is significantly increased.

Scheduling for a massive MIMO scheme in accordance with the present invention includes two steps. First, a network performs intra-class scheduling on each class, and performs inter-class scheduling between classes, so that the computational complexity due to scheduling is significantly reduced.

Figure 3:
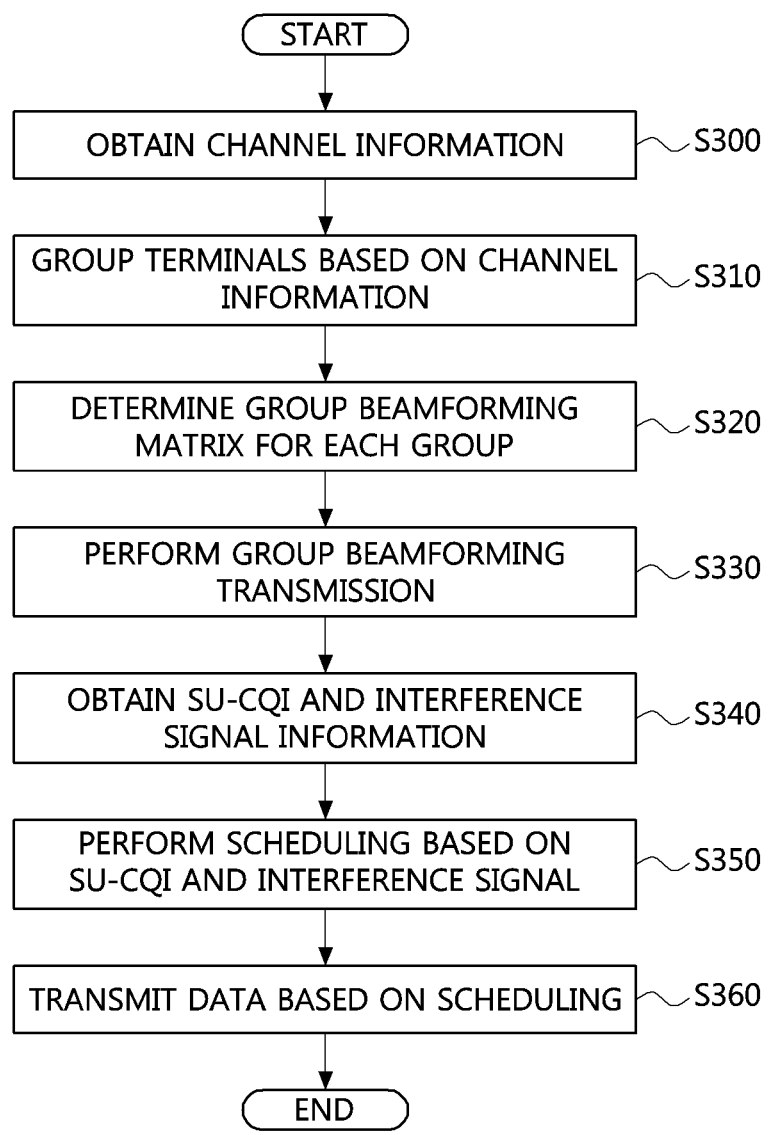
FIG. 3 is a flowchart showing a method for MIMO transmission in accordance with an example embodiment of the present invention.
Figure 4:
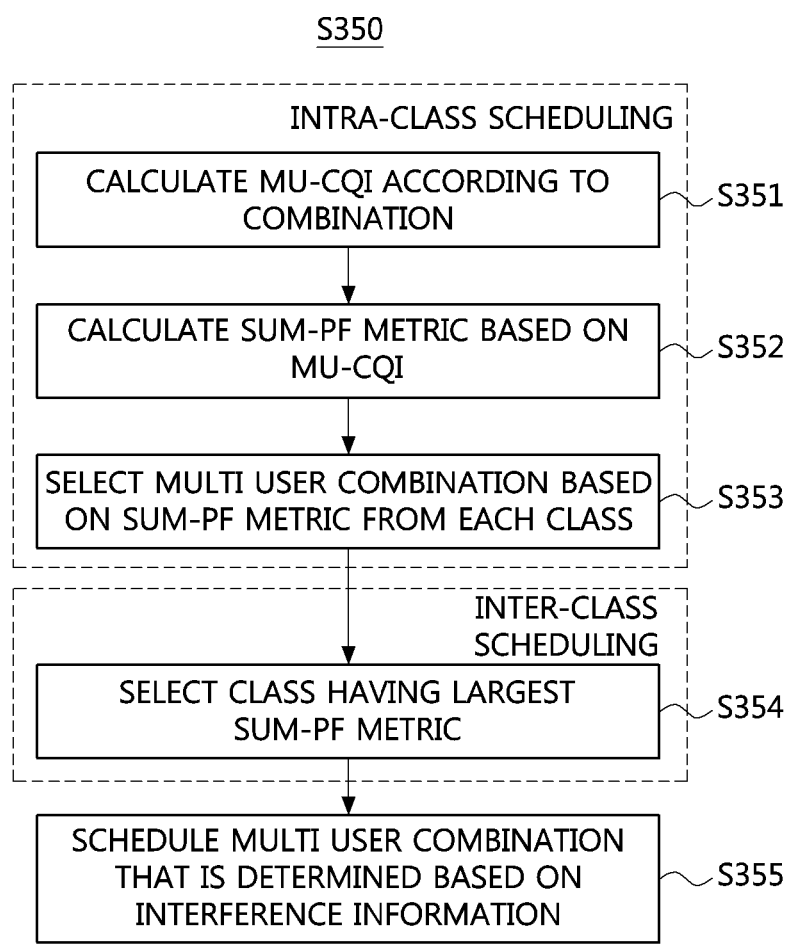
FIG. 4 is a flowchart showing a scheduling process of the method for MIMO transmission in accordance with an example embodiment of the present invention.

FIG. 3 is a flowchart showing a method for MIMO transmission in accordance with an example embodiment of the present invention, and FIG. 4 is a flowchart showing a scheduling process of the method for MIMO transmission in accordance with an example embodiment of the present invention.

Referring to FIGS. 3 and 4, a base station is fed back channel information from one or more terminals or measures channel information through an uplink sounding reference signal (SRS) (S300). The channel information may include at least one of a transmit correlation matrix, an eigenvalue of the transmit correlation matrix, an eigenvector of the transmit correlation matrix, an AS, an AOD and at least one long period PMI selected from a fixed codebook representing channel information.

That is, the base station sets a CSI-RS and transmits the CSI-RS to terminals, and is fed back measurement results obtained from the terminals through the CSI-RS, thereby obtaining channel information. Alternatively, the base station may obtain channel information by directly measuring an uplink SRS that is transmitted from the terminal.

The base station may classify one or more terminals into one or more classes and one or more groups dependent on the class based on the channel information (S310). In detail, the base station may classify terminals whose effective eigenvector matrices are similar to each other into the same group, thereby generating a plurality of groups. In addition, the base station may generate a class by combining groups whose eigenvectors have high orthogonality with respect to each other. Each class classified in this manner is assigned different time resources and different frequency resources, and groups in the same class are assigned the same time resources and the same frequency resources.

The base station may determine a group beamforming matrix for each group based on the channel information (S320). The base station, based on a set or sub-set of column vectors of an eigenvector matrix of a group determined through the terminal classification, generates a beamforming matrix of the group. The base station determines the group beamforming matrix such that group beamforming matrices are quasi orthogonal among the groups based on the channel information and a one-ring channel model.

The base station may perform group beamforming transmission based on the group beamforming matrix on terminals belonging to each group (S330). The base station is fed back SU-CQI information and interference signal information that are measured from a CSI-RS to which the group beamforming is applied or a CSI-RS to which the group beamforming is not applied (S340).

The interference signal information may include at least one of the intensity of an interference signal between terminals belonging to a group and the intensity of an interference signal with respect to another group. The interference signal information may be expressed as an offset value for SU-CQI. The interference signal information may be expressed as CQI defined as an MCS. The interference signal information may be expressed as the intensity of an interference signal with respect to a PMI serving as interference with the terminals belonging to the group. The interference signal information may be expressed as a ratio with respect to the SU-CQI.

Meanwhile, the terminal may feed back interference signal information which includes a PMI whose inner product with a PMI selected by the terminal is smaller than a predetermined value among PMIs that serve as interference with the terminal. In addition, the terminal may feed back interference signal information about a sub-band that has an interference signal intensity smaller than a predetermined value among sub-bands.

The base station may schedule the terminals based on the SU-CQI information and the interference signal information (S350). First, the base station checks non-empty H/V groups based on PMI. Thereafter, the base station performs intra-class scheduling on each class ($t_H$, $t_V$). That is, the base station calculates an MU-CQI for each terminal based on a combination of the non-empty H/V groups belong to a class (that is, when the number of non-empty H/V groups is $\tilde{G}$, group combinations corresponding to $$\sum_{i=1}^{\tilde{G}} \binom{\tilde{G}}{i}$$

are generated), a combination of the terminals belonging to each group and a combination of ranks for each terminal (S351).

The base station calculates a sum-PF metric based on the MU-CQI (S352), and selects a multi user combination (or an MU pair) having a largest sum-PF metric from each class as a sum-PF metric of the each class (S353).

Thereafter, the base performs inter-class scheduling. That is, the base station may select a class having the largest sum-PF metric among all classes (S354).

The base station determines a multi user combination having the least interference with another multi user combination in the selected class, and schedules the determined multi user combination (S355). That is, the base station may check interference between layers through an MUI, and allocate the same DM-RS port to layers having a significantly small MUI. In this case, the layers may be distinguished based on SCID.

Meanwhile, if the number of sets of layers (or terminals) having significantly little interference with each other exceeds 4, the base station drops layers starting from a layer having a smallest sum-PF metric, thereby maintaining a total of 4 DM-RS ports. The base station schedules the finally determined multi-user combination.

Lastly, the based station transmits data to the terminals based on the scheduling (S360). In this case, the base station may transit data to the terminals through a rank which is different from a rank related to the SU-CQI information and the interference signal information. For example, the base station is fed back SU-CQI information and interference signal information through rank 1, and based on the SU-CQI information and interference signal information, may transmit data to the terminals through rank 2.

As is apparent from the above, the amount of feedback of channel state information can be reduced in the MIMO transmission. In addition, even when the amount of feedback of channel state information is reduced, the degradation of frequency efficiency in the uplink and downlink can be minimized.

While the example embodiments of the present invention and their advantages have been described in detail, it should be understood that various changes, substitutions and alterations may be made herein without departing from the scope of the invention.

What is claimed is:

1. A method for a multi-input multi-output (MIMO) transmission performed in a base station, the method comprising:
   receiving a channel quality indicator (CQI) and an inter-user interference information of a terminal;
   calculating a multi user-CQI (MU-CQI) based on the CQI and the inter-user interference information; and
   performing the MIMO transmission for the terminal based on the MU-CQI,
   wherein the terminal selects a precoding matrix indicator (PMI) among a plurality of PMIs to be used for the MIMO transmission, and the inter-user interference information comprises an information related to an inter-user interference signal which is generated based on at least one of interfering PMIs, among the plurality of PMIs, except for the selected PMI,
   wherein the CQI indicates an intensity of a signal generated by the selected PMI, the inter-user interference information indicates an intensity of the inter-user interference signal generated by each of the interfering PMIs, the CQI and the inter-user interference information are used for calculating signal-to-interference-plus-noise ratios (SINRs) with respect to various combinations of users, and the SINRs are used for calculating the MU-CQI.

2. The method of claim 1, wherein the inter-user interference information indicates a modulation and coding scheme (MCS) level corresponding to the intensity of the inter-user interference signal.

3. The method of claim 2, wherein the MCS level is lower than MCS level 0.

4. The method of claim 1, wherein the CQI is a single user-CQI (SU-CQI), and the inter-user interference information indicates an offset of the intensity of the inter-user interference signal relative to the SU-CQI.

5. The method of claim 4, wherein the offset is a difference between a MCS level corresponding to the intensity of the inter-user interference signal and a MCS level of the SU-CQI.

6. The method of claim 1, wherein the CQI is a single user-CQI (SU-CQI), and the inter-user interference information indicates a ratio of the intensity of the inter-user interference signal relative to the SU-CQI.

7. The method of claim 1, wherein the CQI is a SU-CQI of rank 1, the SU-CQI and the inter-user interference information are used for calculating a SU-CQI of rank 2 or more.

8. The method of claim 1, wherein the CQI is a single layer-CQI (SL-CQI) without interference between layers, the SL-CQI and the inter-user interference information are used for calculating a MU-CQI of rank 2 or more.

9. The method of claim 1, wherein the inter-user interference information comprises an information related to an inter-user interference signal whose intensity is lower than a predefined threshold.

10. A method for data reception performed in a terminal, the method comprising:

generating a channel quality indicator (CQI) and an inter-user interference information which are used for calculating a multi user-CQI (MU-CQI) for a multi-input multi-output (MIMO) transmission;

transmitting the CQI and the inter-user interference information to a base station; and receiving data from the base station based on the MIMO transmission, wherein the terminal selects a precoding matrix indicator (PMI) among a plurality of PMIs, and the inter-user interference information comprises an information related to an inter-user interference signal which is generated based on at least one of interfering PMIs, among the plurality of PMIs, except for the selected PMI, wherein the CQI indicates an intensity of a signal generated by the selected PMI, the inter-user interference information indicates an intensity of the inter-user interference signal generated by each of the interfering PMIs, the CQI and the inter-user interference information are used for calculating signal-to-interference-plus-noise ratios (SINRs) with respect to various combinations of users, and the SINRs are used for calculating the MU-CQI.

11. The method of claim 10, wherein the inter-user interference information indicates a modulation and coding scheme (MCS) level corresponding to the intensity of the inter-user interference signal.

12. The method of claim 11, wherein the MCS level is lower than MCS level 0.

13. The method of claim 10, wherein the CQI is a single user-CQI (SU-CQI), and the inter-user interference information indicates an offset of the intensity of the inter-user interference signal relative to the SU-CQI.

14. The method of claim 13, wherein the offset is a difference between a MCS level corresponding to the intensity of the inter-user interference signal and a MCS level of the SU-CQI.

15. The method of claim 10, wherein the CQI is a single user-CQI (SU-CQI), and the inter-user interference information indicates a ratio of the intensity of the inter-user interference signal relative to the SU-CQI.

16. The method of claim 10, wherein the CQI is a SU-CQI of rank 1, the SU-CQI and the inter-user interference information are used for calculating a SU-CQI of rank 2.

17. The method of claim 10, wherein the CQI is a single layer-CQI (SL-CQI) without interference between layers, the SL-CQI and the inter-user interference information are used for calculating a MU-CQI of rank 2 or more.

18. The method of claim 10, wherein the CQI and the inter-user interference information are transmitted per subband.

19. The method of claim 10, wherein the inter-user interference information comprises an information related to an inter-user interference signal whose intensity is lower than a predefined threshold.

* * * * *